Patented Dec. 28, 1948

2,457,406

UNITED STATES PATENT OFFICE 2,457,406

HALO NITROALCOHOL MODIFIED AMINOPLASTS

Milton J. Scott, Springfield, Mass., assignor to Monsanto Chemical Company, St. Louis, Mo., a corporation of Delaware No Drawing. Application September 25, 1945, Serial No. 618,590

9 Claims. (Cl. 260—29.4)

This invention relates to modified alkylol aminotriazine resins and the process for preparing them. More particularly the invention relates to alkylol melamines modified with halogenated nitro alcohols. The invention further relates to compositions containing halogenated nitro alcohol-modified alkylol melamines and to textiles or other fibrous materials treated therewith.

It is well known to react alkylol aminotriazines with unsubstituted alcohols to form so-called alkylol aminotriazine ethers. The known ethers are used in various textile and paper sizing processes and in protective coatings. They possess several disadvantages; (1) they have a limited compatibility with alkyd resins; (2) they are relatively slow curing; (3) they tend to pick up undesirable anions when applied to textiles; (4) they become less soluble in water as the number of "ether" groups per molecule is increased. The resins of this invention have been found to overcome the disadvantages inherent in the prior art alkylol aminotriazine-alcohol reaction products.

It is an object of this invention to provide new chemical compositions.

A further object is to provide new reaction products of alkylol aminotriazines.

Another object is to provide halogenated nitro alcohol-modified alkylol melamines.

These and other objects are attained by reacting alkylol aminotriazines with halogenated nitro alcohols in the presence of acid catalysts.

The following examples are given in illustration of this invention and are not intended to limit the scope thereof. Where parts are mentioned, they are parts by weight.

EXAMPLE I 206 parts of crystalline hexamethylol melamine (1 mol) were suspended in a mixture of 1400 parts (10 mols) of 3-chloro-2-nitro-1-butanol and 2 parts (0.03 mol) of concentrated hydrochloric acid. The mixture was then refluxed at atmospheric pressure for one hour. During the refluxing action the crystalline hexamethylol melamine dissolved and a clear, slightly yellow solution of a modified methylol melamine in 3-chloro-2-nitro-1-butanol was obtained. The resinous product was recovered from solution by evaporation of the solvent under vacuum.

EXAMPLE II 206 parts (1 mol) of hexamethylol melamine were mixed with 1300 parts (10 mols) of 2-chloro-2-nitro-1-propanol and 5 parts (0.05 mol) of sulphuric acid. The mixture was heated under reflux for 2 hours at atmospheric pressure to produce a clear, slightly yellow solution of a modified methylol melamine in 2-chloro-2-nitro-1-propanol from which a slightly yellow resin was obtained by evaporation under vacuum.

According to another embodiment of this invention, mixtures of other alcohols with halogenated nitro alcohols may be reacted with the alkylol aminotriazine.

EXAMPLE III 206 parts (1 mol) of hexamethylol melamine were suspended in 120 parts (6 mols) of methanol, 600 parts (3 mols) of 1,4-dihydroxy-2-chloro-3-nitro-3-methylol butane and 5 parts (0.03 mol) of toluene sulphonic acid were added to the suspension and the mixture was refluxed at atmospheric pressure for 1½ hours. A clear, nearly colorless methanol solution was obtained from which a water-soluble resin was recovered by vacuum evaporation.

Other alcohols may be substituted for the methanol of Example III such as ethanol, propanol, butanol, benzyl-alcohol, polyhydric alcohols including glycol, glycerin, etc. The relative amounts of the two reacting alcohols may be varied with the halogenated nitro alcohol sufficient to constitute up to about 95% of the alcohol mixture reacted, or as little as about 5% of the alcohol mixture reacted.

Aminotriazines having fewer than 6 alkylol groups per mol may also be reacted with a mixture of halogenated nitro alcohols and unsubstituted alcohols. The reactivity of the halogenated nitro alcohols appears to be greater than that of the unsubstituted alcohols with the result that the reaction between the halogenated nitro alcohol and the alkylol aminotriazine takes place more rapidly and apparently, at times at the expense of already reacted unsubstituted alcohols. Thus the unsubstituted alcohol may be reacted with the aminotriazine and aldehyde and the product subsequently reacted with halogenated nitro alcohol.

In a further embodiment of this invention the halogenated nitro alcohol reaction products may be obtained by starting with a reaction mixture of aminotriazine, aldehyde and halogenated nitro alcohol with or without incorporating an unsubstituted alcohol.

EXAMPLE IV 126 parts (1 mol) of melamine were mixed with 380 parts (5 mols) of formalin (37% formaldehyde), 592 parts (8 mols) of butanol and 400 parts (2 mols) of 1,4-dihydroxy-2-chloro-3-nitro-3-methylol butane. The pH of the mixture was adjusted to about 6 to 7 with alkali and the temperature of the mixture was raised until azeotropic distillation of butanol and water began. The reaction was continued at this temperature and the butanol-rich phase of the distillate continuously returned to the reaction until only a single phase was found in the distillate. At this point, anhydrous butanol was added to the reaction mixture and wet butanol distilled from the mixture until the specific gravity of the distillate indicated that substantially all of the water had been removed from the mixture. The mixture was then concentrated by vacuum distillation and xylol was added to the concentrate to obtain a clear, substantially colorless syrup.

The melamine shown in the above examples may be replaced, in whole or in part, by other aminotriazines such as 2,4-diamino-1,3,5-triazine, 2-amino-1,3,5-triazine, melam, melem, aminotriazines in which one or two amino groups are substituted by hydroxy, halogen, alkyl, aryl, or aralkyl groups such as 2-hydroxy-4,6-diamino-1,3,5-triazine, 2,4-dihydroxy-6-amino-1,3,5-triazine, 2-chloro-4,6-diamino-1,3,5-triazine, 2-p-hydroxy phenylene-4,6-diamino-1,3,5-triazine, 2-phenyl-4-amino-6-hydroxy-1,3,5-triazine, aminotriazines wherein the hydrogen atoms of the amino groups are partially substituted by amino, alkyl, aryl or aralkyl groups such as mono-, di-, or tri- alkyl-melamines, e. g., 2,4,6-triethyl-triamino-1,3,5-triazine, mono-, di-, or tri- aralkyl, or mono-, di-, or tri- aryl melamines, e. g., 2,4,6-triphenyl-triamino-1,3,5-triazine, etc.

The solutions obtained in Examples I and II may be stabilized by neutralization or buffering of the acid catalysts with bases, alkalies or quaternary ammonium bases and the solution then used without further modification.

The resinous products may be obtained from the solution after stabilization by conventional methods such as vacuum drying or oven drying.

The halogenated nitro alcohols of this invention are aliphatic alcohols substituted by one or more nitro groups and one or more halogen groups. The halogen and nitro groups may be on the same or different carbon atoms. Examples of the halogenated nitro alcohols are 2-nitro-2-chloro-1-propanol, 2-nitro-2-chloro-1-butanol, 2-chloro-2-nitro-1-pentanol, 2-chloro-2-nitro-1-hexanol, 3-chloro-2-nitro-1-butanol, 3,3 dichloro-2-nitro-1-butanol, 3,4 dichloro-2-nitro-1-pentanol, 3-chloro-2-nitro-1-butanediol, 1,4 dihydroxy-2-chloro-3-nitro-3-methylol butane, 2-nitro-2-brom-1-propanol, 2-nitro-2-iodo-1-propanol, 2-nitro-2-fluoro-1-butanol, etc.

Hydrochloric and sulphuric acids are shown in the examples as catalysts for the reaction. They may be replaced by other inorganic or organic acids such as phosphoric, nitric, oxalic, phthalic, chlorosulfonic, toluene sulfonic, etc.

The methylol melamine of the example may be replaced by melamines having fewer methylol groups such as tri-, or tetra-methylol melamine or by methylol derivatives of other aminotriazines. Similarly, the condensation products of aminotriazines with other aldehydes other than formaldehyde, such as acetaldehyde, butyraldehyde, crotonaldehyde, acrolein, cinnamaldehyde, benzaldehyde, furfural, etc., may be reacted with the halogenated nitro alcohols.

The resinous products of this invention may be considered chemically to be halogenated nitro alcohol ethers or mixed ethers of alkylolaminotriazines, but there is much evidence that some other type of condensation takes place, especially with such halogenated nitro alcohols as 3-chloro-2-nitro-1-butanol. The resins are soluble in alcohols, esters, other common lacquer solvents and may be applied from solution by spraying, roll coating, dipping, brushing, or other conventional methods, to various surfaces such as wood, metal, glass, paper, textiles, etc., to provide moisture-resistant protective coatings. When applied as noted, they may be hardened by heating with or without the addition of an acid or acid reacting catalyst such as diammonium phosphate, ammonium oxalate, or other ammonium salts, other acid-reacting salts, etc. These catalysts may be acids per se or may be of the latent type which develop acidity when heated with the resin.

For many uses in protective coating applications, the resins of this invention may be modified by the addition of conventional coating ingredients such as fibers, fillers, pigments, dyes, lubricants, synthetic and natural resins, for example, alkyd resins, phenolic resins, vinyl resins, kauri, drying oils, for example, linseed oil, tung oil, etc.

The water-soluble resins of this invention are particularly useful in the textile and paper industry.

*Example V*

Cotton sheeting was dipped into a 10% solids solution of a resin such as is shown in Example III, in a 50–50 (by weight) water-methanol solvent. The fabric was squeezed to give an ultimate pickup of a 10% resin on a dry fabric basis. The fabric was dried at room temperature and then heated for ½ hour at 250° F. to cure the resin. The treated fabric had a soft hand, exhibited low anion (chlorine) pickup in bleaching treatment and showed little shrinkage on washing.

Acid or acid-reacting catalysts previously described may be added to resin solutions used for treatment of textiles to shorten the curing time or lower the temperature of cure of the resin.

A 9" by 8" sample of the cotton sheet treated as shown in Example V was bleached by treatment with 400 cc. of 14% sodium hypochlorite solution for 5 minutes at room temperature and then washed thoroughly until a sample of the wash water gave no blue test with potassium iodide-starch solution. The fabric was dried and then agitated in 400 cc. of a water solution containing 10 cc. of a 5% potassium iodide and 5 cc. of starch solution for 5 minutes. The solution was then titrated with N/100 $Na_2S_2O_3$ until blue color disappeared and the amount of chlorine was then calculated. The chlorine pickup of the treated fabric was only 0.002% as compared with a similar fabric treated with a methyl ether of methylol melamine, in which case the chlorine pickup was 0.024%.

The reduction of chlorine pickup in the bleaching operation is particularly advantageous to the textile industry since retained chlorine tends to weaken the fabric and gradually causes deterioration.

Other fabrics may be treated in a similar manner to shrinkproof and/or creaseproof them and render them less susceptible to anion pickup during subsequent operations such as bleaching. The amount of resin absorbed on the fabric may be substantially varied from a small amount up to about 15% by weight on a dry fabric basis.

The resins of this invention have a fungicidal and bacterial action which is advantageous in coating applications where the coating is exposed to bacteria and fungus growths such as antifouling marine paints. The fungicidal properties are also of importance in the textile and paper industries since textiles and papers, treated with the resins show increased resistance to mildew and other common fungi.

Paper may be treated with the water-soluble halogenated nitro alcohol-modified resins of this invention, either by impregnating a web, or adding a solution of the halogenated nitro alcohol-modified resins to the pulp fibers in a beater or Hollander. If desired, the resin may be precipitated on the web or fibers by the addition of acids, or acid salts. The treated paper has increased wet and dry strength and increased moisture resistance.

The above description is given in illustration and not in limitation of this invention, as described in the appended claims.

What is claimed is:

1. A composition comprising a resinous heat reaction product of an aminotriazine-aldehyde condensation product and a compound taken from the group consisting of acyclic compounds having from 3 to 6 carbon atoms to which are attached one nitro group, from 1 to 2 halogen atoms, from 1 to 2 hydroxyl groups none of which are attached to a carbon atom to which the nitro group and halogen atoms are attached, said compounds containing no other substituent, the molar ratio of said compounds to aminotriazine varying from 2-1 to 10-1.

2. A composition as in claim 1 wherein the aldehyde is formaldehyde.

3. A composition as in claim 1 wherein the aminotriazine is melamine.

4. A composition as in claim 1 wherein the halogen is chlorine.

5. A composition as in claim 1 wherein the aminotriazine is melamine, the aldehyde is formaldehyde and the halogen is chlorine.

6. A composition comprising a resinous heat reaction product of an aminotriazine-aldehyde condensation product, an unsubstituted alcohol and a compound taken from the group consisting of acyclic compounds having 3 to 6 carbon atoms to which are attached one nitro group, from 1 to 2 halogen atoms, from 1 to 2 hydroxyl groups none of which are attached to a carbon atom to which the nitro group and halogen atoms are attached, said compounds containing no other substituent, the molar ratio of said compounds to aminotriazine varying from 2-1 to 10-1.

7. A coating composition comprising an organic solvent solution of a resinous heat reaction product of an aminotriazine-aldehyde condensation product and a compound taken from the group consisting of acyclic compounds having from 3 to 6 carbon atoms to which are attached one nitro group, from 1 to 2 halogen atoms, from 1 to 2 hydroxyl groups none of which are attached to a carbon atom to which the nitro group and halogen atoms are attached, said compounds containing no other substituent, the molar ratio of said compounds to aminotriazine varying from 2-1 to 10-1.

8. A textile treating composition comprising an aqueous solution of a resinous heat reaction product of an aminotriazine-aldehyde condensation product and a compound taken from the group consisting of acyclic compounds having from 3 to 6 carbon atoms to which are attached one nitro group, from 1 to 2 halogen atoms, from 1 to 2 hydroxyl groups none of which are attached to a carbon atom to which the nitro group and halogen atoms are attached, said compounds containing no other substituent, the molar ratio of said compounds to aminotriazine varying from 2-1 to 10-1.

9. A textile fabric impregnated with up to 15% by weight of a resinous heat reaction product of an aminotriazine-aldehyde condensation product and a compound taken from the group consisting of acyclic compounds having from 3 to 6 carbon atoms to which are attached one nitro group, from 1 to 2 halogen atoms, from 1 to 2 hydroxyl groups none of which are attached to a carbon atom to which the nitro group and halogen atoms are attached, said compounds containing no other substituent, the molar ratio of said compounds to aminotriazine varying from 2-1 to 10-1.

MILTON J. SCOTT.

REFERENCES CITED

The following references are of record in the file of this patent:

UNITED STATES PATENTS

| Number | Name | Date |
|---|---|---|
| 2,339,622 | D'Alelio | Jan. 18, 1944 |
| 2,339,768 | D'Alelio | Jan. 25, 1944 |